(12) United States Patent
Liu et al.

(10) Patent No.: US 11,989,304 B2
(45) Date of Patent: May 21, 2024

(54) SECURE MULTI-BIOS-IMAGE SYSTEM

(71) Applicant: Dell Products L.P., Round Rock, TX (US)

(72) Inventors: Wei Liu, Austin, TX (US); Alberto David Perez Guevara, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 17/690,164

(22) Filed: Mar. 9, 2022

(65) Prior Publication Data
US 2023/0289446 A1    Sep. 14, 2023

(51) Int. Cl.
G06F 21/57      (2013.01)

(52) U.S. Cl.
CPC .......... G06F 21/575 (2013.01); G06F 21/572 (2013.01)

(58) Field of Classification Search
CPC ..... G06F 21/575; G06F 21/572; G06F 9/4411
See application file for complete search history.

(56) References Cited

U.S. PATENT DOCUMENTS

| | | | | |
|---|---|---|---|---|
| 2002/0194313 A1* | 12/2002 | Brannock | ............ | H04L 67/34 717/176 |
| 2004/0230788 A1* | 11/2004 | Zimmer | ............ | G06F 11/1441 714/E11.138 |
| 2006/0075276 A1* | 4/2006 | Kataria | ............ | G06F 8/65 714/E11.135 |
| 2011/0252225 A1* | 10/2011 | Liu | ............ | G06F 9/4418 713/300 |
| 2014/0250291 A1* | 9/2014 | Adams | ............ | G06F 21/575 713/2 |
| 2017/0010884 A1* | 1/2017 | Liu | ............ | G06F 21/57 |
| 2018/0293061 A1* | 10/2018 | Arms | ............ | G06F 8/654 |
| 2023/0297683 A1* | 9/2023 | Liu | ............ | G06F 21/31 713/2 |

* cited by examiner

*Primary Examiner* — Jaweed A Abbaszadeh
*Assistant Examiner* — Hyun Soo Kim
(74) *Attorney, Agent, or Firm* — Joseph Mencher

(57) ABSTRACT

A secure multi-Basic Input/Output System (BIOS)-image system includes a BIOS storage system having a first BIOS storage region and a second BIOS storage region. A first BIOS image is stored in the first BIOS storage region and is configured to utilize a plurality of initialization drivers during a first initialization process. A BIOS subsystem is coupled to the BIOS storage system. The BIOS subsystem receives second BIOS storage region write-enablement information and, in response, enables writing to the second BIOS storage region. Subsequent to enabling writing to the second BIOS storage region, the BIOS subsystem writes a second BIOS image to the second BIOS storage region. The BIOS subsystem may then use the second BIOS image that was written to the second BIOS storage region to perform a second initialization process that utilizes a subset of the plurality of initialization drivers.

20 Claims, 6 Drawing Sheets

SECURE MULTI-BIOS-IMAGE SYSTEM

BACKGROUND

The present disclosure relates generally to information handling systems, and more particularly to securely allowing multiple BIOS images to be provided in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking devices (e.g., switch devices), storage systems, desktop computing devices, laptop/notebook computing devices, tablet computing devices, mobile phones, and/or other computing devices known in the art, utilize a Basic Input/Output System (BIOS) that may be provided by firmware and that may be configured to perform hardware initialization during a boot process (e.g., Power On STart-up (POST)) for the computing device, runtime services for operating systems and applications provided on the computing device, as well as other BIOS functionality known in the art. For example, the Unified Extensible Firmware Interface (UEFI) "BIOS" defines a software interface between operating systems and platform firmware, and replaces the legacy BIOS traditionally utilized in many computing devices (while providing support for legacy BIOS services). Recently, the "LinuxBoot" BIOS has begun development in an alternative to the use of the UEFI BIOS, and aims to replace many of the Driver Execution Environment (DXE) modules utilized by the UEFI BIOS with the Linux kernel and/or other "trusted" Linux software. However, the provisioning of the LinuxBoot BIOS on computing devices raises some issues, as many computing device manufacturers integrate security functionality with the UEFI BIOS in their computing devices in order to address potential security concerns, while the LinuxBoot BIOS attempts to utilize as little of the UEFI BIOS functionality as possible before enabling the "trusted" Linux software discussed above.

Accordingly, it would be desirable to allow the use of a LinuxBoot BIOS in a computing system while also addressing the potential security concerns discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured to: write a first BIOS image to a first BIOS storage region in a BIOS storage system, wherein the first BIOS image is configured to utilize a plurality of initialization drivers during a first initialization process; receive second BIOS storage region write-enablement information; enable, in response to receiving the second BIOS storage region write-enablement information, writing to a second BIOS storage region of the BIOS storage system; write, subsequent to enabling writing to the second BIOS storage region, a second BIOS image to the second BIOS storage region; and perform, using the second BIOS image that was written to the second BIOS storage region, a second initialization process that utilizes a subset of the plurality of initialization drivers.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
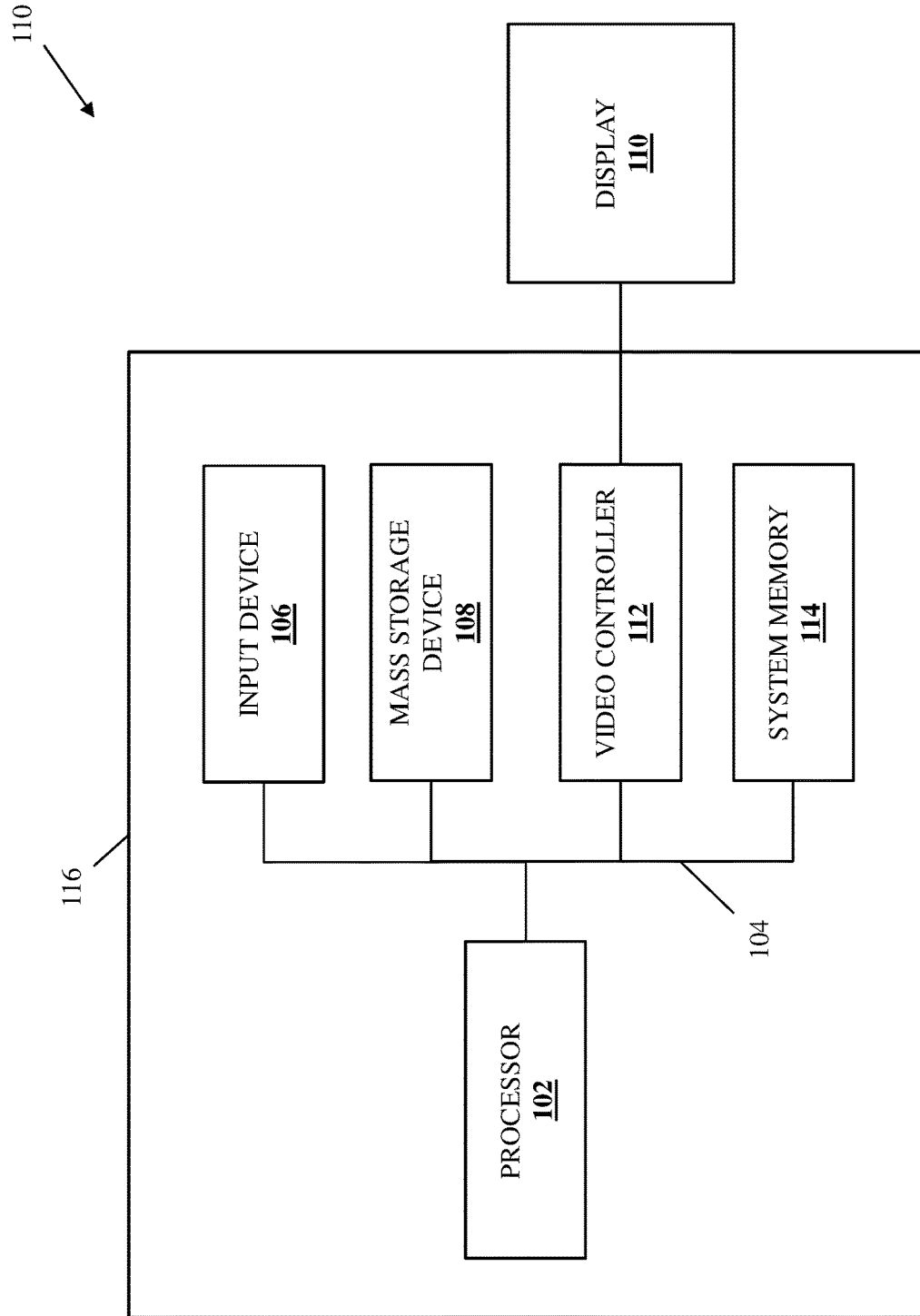
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
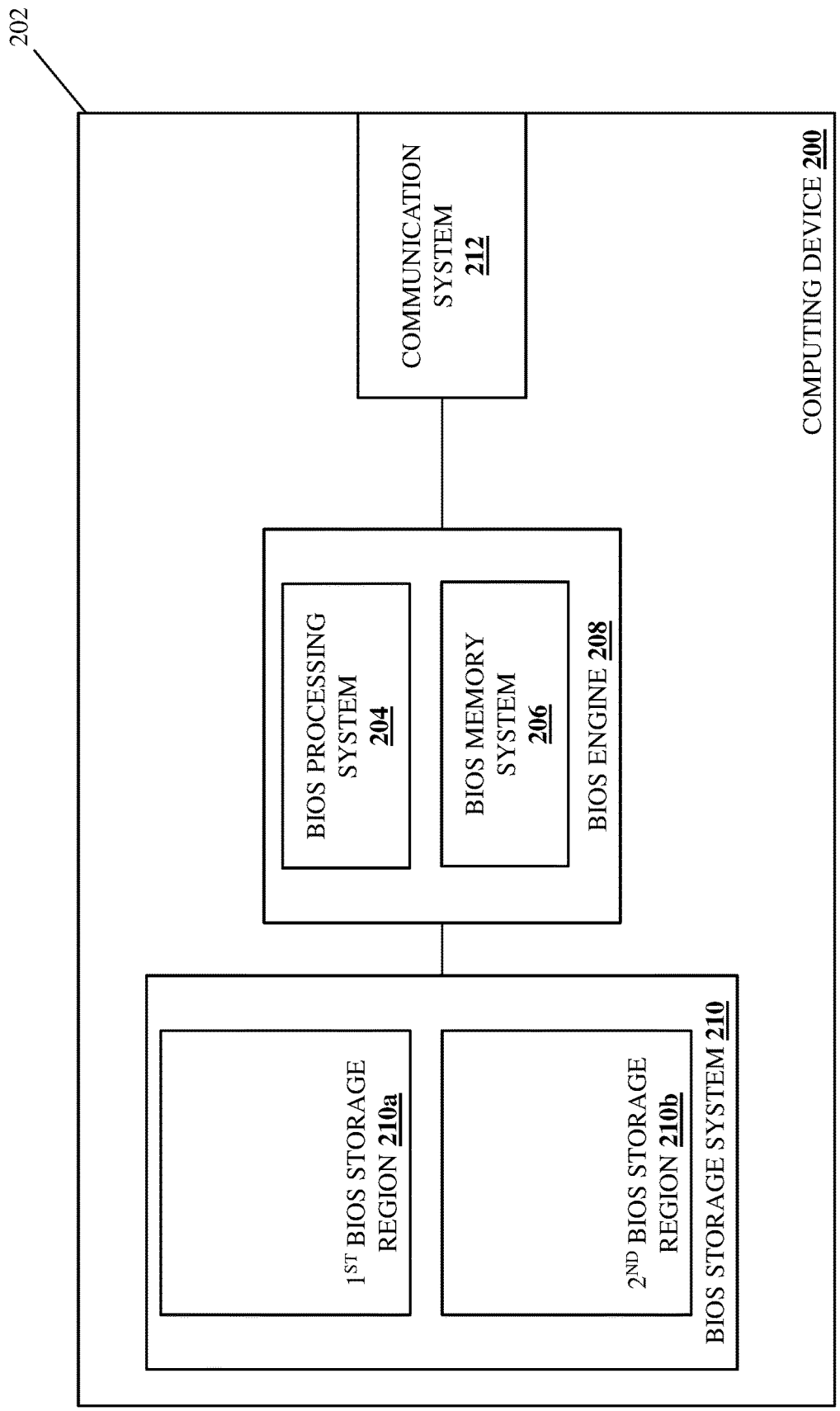
FIG. 2 is a schematic view illustrating an embodiment of a computing device that may include the secure multi-BIOS-image system of the present disclosure.

Referring now to FIG. 2, an embodiment of a computing device 200 is illustrated that may include the secure multi-BIOS-image system of the present disclosure. In an embodiment, the computing device 200 may be provided by the IHS 100 discussed above with reference to FIG. 1 and/or may include some or all of the components of the IHS 100, and in specific examples may be provided by server devices, networking devices (e.g., switch devices), storage systems, desktop computing devices, laptop/notebook computing devices, tablet computing devices, mobile phones, and/or other computing devices known in the art. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and discussed below. For example, the chassis 202 may house a BIOS processing system 204 (e.g., which may include the processor 102 discussed above with reference to FIG. 1) and a BIOS memory system 206 (e.g., which may include the memory 114 discussed above with reference to FIG. 1) that is coupled to the BIOS processing system 204 and that includes instructions that, when executed by the BIOS processing system 204, cause the BIOS processing system 204 to provide a BIOS engine 208 that is configured to perform the functionality of the BIOS engines, BIOS subsystems, and/or computing devices discussed below.

The chassis 202 may also house a BIOS storage system 210 (e.g., which may include the storage 108 discussed above with reference to FIG. 1) that is coupled to the BIOS engine 208 (e.g., via a coupling between the BIOS storage system 210 and the BIOS processing system 204) and that may be provided by a Serial Peripheral Interface (SPI) region in a code SPI Read-Only Memory (ROM) storage device and/or other BIOS storage devices that would be apparent to one of skill in the art in possession of the present disclosure. In the illustrated embodiment, the BIOS storage system 210 includes a first BIOS storage region 210a and a second BIOS storage region 210b which, as discussed below, may be provided by different regions of the BIOS storage system 210, with the first BIOS storage region 210a of the BIOS storage system 210 utilized to store a first BIOS image provided by a UEFI BIOS image, and the second BIOS storage region 210b of the BIOS storage system 210 utilized to store a second BIOS image provided by a LinuxBoot BIOS image. However, while two particular BIOS images are described herein, the storage of other BIOS images is envisioned as falling within the scope of the present disclosure as well.

The chassis 202 may also house a communication system 212 that is coupled to the BIOS engine 208 (e.g., via a coupling between the communication system 212 and the BIOS processing system 204) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
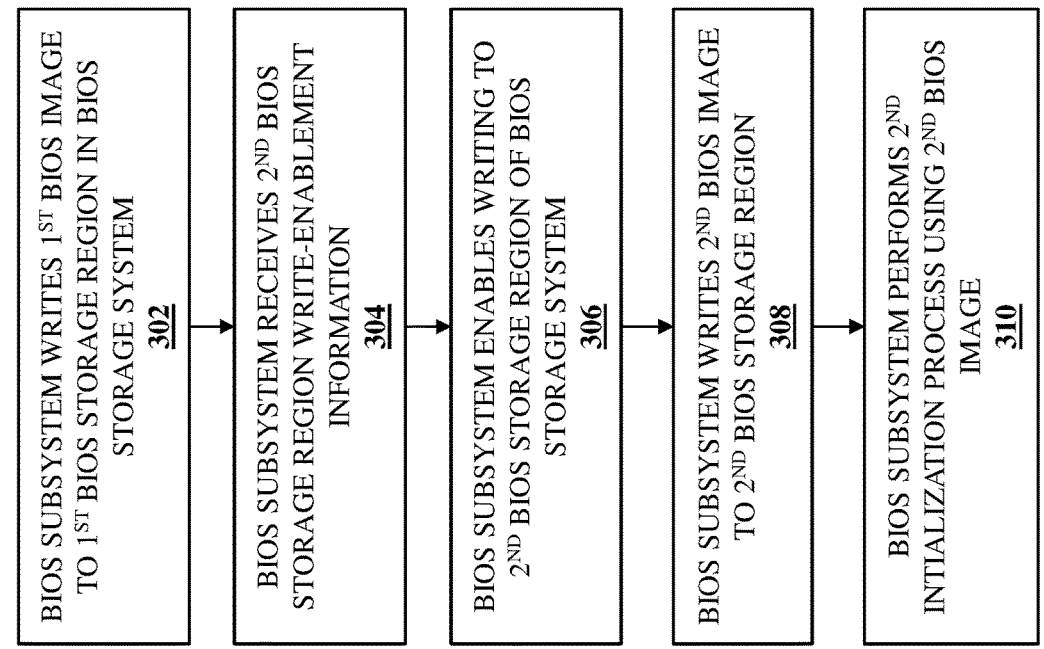
FIG. 3 is a flow chart illustrating an embodiment of a method for providing a secure multi-BIOS-image system.

Referring now to FIG. 3, an embodiment of a method 300 for providing a secure multi-Basic Input/Output System (BIOS)-image system is illustrated. As discussed below, the systems and methods of the present disclosure reserve/dedicate a second BIOS storage region of a BIOS storage system for storing a second BIOS image (along with a first BIOS image that is stored in a first BIOS storage region of the BIOS storage system), and enable the selection of that second BIOS image for use with the computing device, as well as the updating of that second BIOS image when desired. For example, the secure multi-BIOS-image system of the present disclosure may include a BIOS storage system having a first BIOS storage region and a second BIOS storage region. A first BIOS image is stored in the first BIOS storage region and is configured to utilize a plurality of initialization drivers during a first initialization process. A BIOS subsystem is coupled to the BIOS storage system. The BIOS subsystem receives second BIOS storage region write-enablement information and, in response, enables writing to the second BIOS storage region. Subsequent to enabling writing to the second BIOS storage region, the BIOS subsystem writes a second BIOS image to the second BIOS storage region. The BIOS subsystem may then use the second BIOS image that was written to the second BIOS storage region to perform a second initialization process that utilizes a subset of the plurality of initialization drivers. As such, the use of a second BIOS image that utilizes limited initialization drivers is supported in a computing device, while also allowing for use of a first BIOS image that utilizes the full set of initialization drivers in that computing device.

The method 300 begins at block 302 where a BIOS subsystem writes a first BIOS image to a first BIOS storage region in a BIOS storage system. As will be appreciated by one of skill in the art in possession of the present disclosure, block 302 of the method 300 may be performed during the manufacture of the computing device 200 by a computing device manufacturer (also referred to as an Original Equipment Manufacturer (OEM)). As such, during or prior to the method 300, the computing device 200 may be configured to enable at least some of the functionality discussed below. For example, with reference back to FIG. 2, the computing device 200 may be configured by defining the first BIOS storage region 210a and the second BIOS storage region 210b in the BIOS storage system 210 (e.g., by reserving/dedicating the second BIOS storage region 210b in the BIOS storage system 210, which may be an SPI region in a code SPI ROM storage device, for storing a second BIOS image that may be provided by LinuxBoot BIOS image discussed below), excluding the second BIOS storage region 210b from a BIOS Image Information Block (IIB), and/or performing other configuration operations that one of skill in the art in possession of the present disclosure would recognize as providing the functionality discussed below.

As will be appreciated by one of skill in the art in possession of the present disclosure, the BIOS IIB discussed above may define information whose authenticity may be checked as part of BIOS security operations by, for example, generating of a hash value using the information defined by the BIOS IIB and checking that hash value against a known hash value to determine whether any information defined by the BIOS IIB has been modified. For example, conventional UEFI BIOS security operations typically define the BIOS IIB (i.e., during the build of the BIOS as part of the manufacture of the computing device 200) to include the UEFI BIOS image used with a computing device in order to determine whether that UEFI BIOS image has been modified, and a Root of Trust (RoT) device in the computing device (e.g., a remote access controller device such as the integrated DELL® Remote Access Controller (iDRAC) device in server devices provided by DELL® Inc. of Round Rock, Texas, United States) will only allow a central processing system (e.g., a Central Processing Unit (CPU)) in the computing device to utilize that UEFI BIOS image in the event it has not been modified (i.e., in the event the RoT device determines that a hash value generated using the UEFI BIOS image matches a known hash value).

However, one of skill in the art in possession of the present disclosure will also recognize that the inclusion of the LinuxBoot BIOS image in the BIOS storage system 210, as described in further detail below, could result in the RoT device discussed above identifying a BIOS corruption (e.g., when the LinuxBoot BIOS image is provided on the computing device 200 by a user following the manufacture of the computing device 200 and its delivery to the user) and, in response, disallowing use of the LinuxBoot BIOS image by the central processing system, and thus the exclusion of the second BIOS storage region 210b from the BIOS IIB may operate to prevent such issues. As discussed in further detail below, in such situations the authentication of the second BIOS image may instead be performed later in the boot/initialization process. As will be appreciated by one of skill in the art in possession of the present disclosure, the second BIOS image (e.g., the LinuxBoot BIOS image) will typically be provided on the computing device 200 after the build of the BIOS during the manufacture of the computing device 200, and thus the exclusion of the second BIOS storage region 210b from the BIOS IIB may be performed because a known hash value for the second BIOS image cannot be provided in the BIOS IIB subsequent to the build of the BIOS.

Furthermore, in the examples below, the BIOS engine 208 is configured to provide a first Firmware Management Protocol (FMP) subsystem for the first BIOS image/first BIOS storage region 210a, and a second FMP subsystem for the second BIOS image/second BIOS storage region 210b of the BIOS storage system 210, with the first and second FMP subsystems provided via UEFI capsule technique and by capsule-based FMP instances that are stored in the BIOS memory system 206 and configured to update their respective first BIOS image/first BIOS storage region 210a and second BIOS image/second BIOS storage region 210b of the BIOS storage system 210. As will be appreciated by one of skill in the art in possession of the present disclosure, the separation of the first and second FMP subsystems operates to separate the first BIOS image that is configured to only be updated by the computing device manufacturer (e.g., the UEFI BIOS image discussed below), and the second BIOS image that may be updated by the user (e.g., the LinuxBoot BIOS image discussed below). However, while separate FMP subsystems are illustrated and described herein, one of skill in the art in possession of the present disclosure will appreciate how a single, multi-function FMP subsystem may be provided by the BIOS engine 208 while remaining within the scope of the present disclosure as well.

Figure 4:
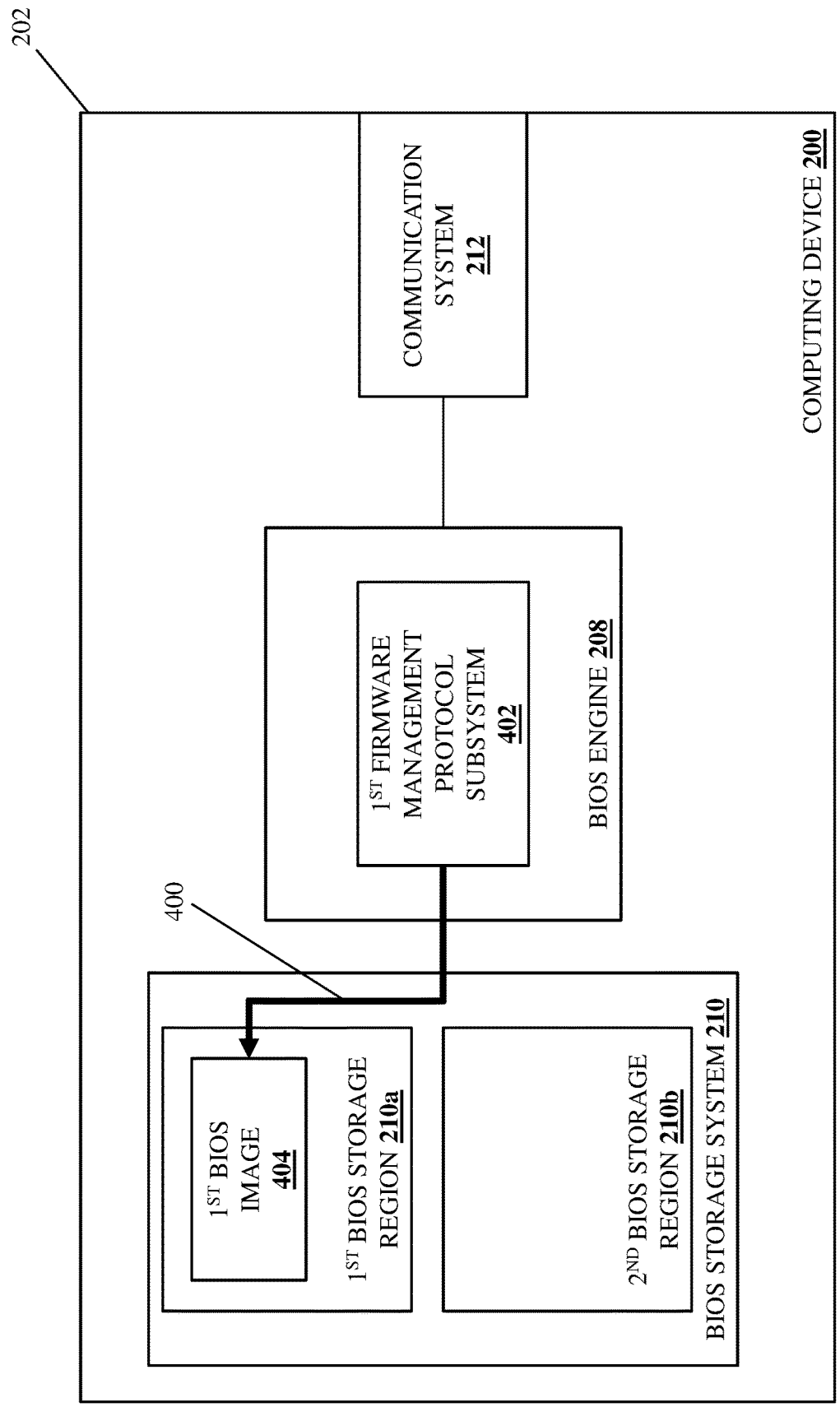
FIG. 4 is a schematic view illustrating an embodiment of the computing device of FIG. 2 operating during the method of FIG. 3.

With reference to FIG. 4, in an embodiment of block 302, the BIOS engine 208 may perform first BIOS image writing operations 400 that may include the BIOS engine providing a first FMP subsystem 402 and using the first FMP subsystem 402 to write a first BIOS image 404 to the first BIOS storage region 210a in the BIOS storage system 210. As discussed above, the BIOS engine 208 may be configured to provide the first FMP subsystem 402 (e.g., using UEFI capsule techniques) in order to update the first BIOS image/first BIOS storage region 210a, and the first BIOS image writing operations 400 described above may provide for the first writing of the first BIOS image 404 to the first BIOS storage region 210a in the BIOS storage system 210 (e.g., during manufacture of the computing device 200). In a specific example, power-on of the computing device 200 at block 302 may result in the BIOS engine 208 providing a bootloader, and the bootloader loading the first FMP subsystem 402 relatively early in the POST initialization process and before the boot storage system 210 is restricted (e.g., before a SPI chip is locked), followed by that first FMP subsystem 402 writing the first BIOS image 404 to the first BIOS storage region 210a in the BIOS storage system 210.

In the embodiments discussed below, the first BIOS image 404 is a conventional UEFI BIOS image that utilizes three initialization phases: a SECurity (SEC) phase involving SEC initialization drivers, a Pre-Efi Initialization (PEI) phase involving PEI initialization drivers, and a Driver eXecution Environment (DXE) phase involving DXE initialization drivers, and one of skill in the art in possession of the present disclosure will recognize how the particular SEC initialization drivers, PEI initialization drivers, and DXE initialization drivers utilized with the UEFI BIOS image for any particular computing device may change depending on details of those computing device. Furthermore, while not described herein in detail, one of skill in the art in possession of the present disclosure will appreciate how, following block 302, the BIOS engine 208 may utilize the first BIOS image 404 to perform a first initialization process (e.g., a UEFI initialization process) for the computing device 200 that includes the SEC phase, the PEI phase, and the DXE phase discussed above in order to initialize the computing device 200 and provide the computing device 200 in a runtime state (e.g., where the computing device 200 is controlled by an operating system and/or applications). However, while a particular first BIOS image 404 has been described, one of skill in the art in possession of the present disclosure will appreciate how other first BIOS images will fall within the scope of the present disclosure as well.

As such, one of skill in the art in possession of the present disclosure will recognize how the writing of the first BIOS image 404 to the first BIOS storage region 210a in the BIOS storage system 210 may be performed substantially conventionally, with the exception of the reserved/dedicated second BIOS storage region 210b in the BIOS storage system 210 (i.e., so that the second BIOS storage region 210b of the BIOS storage system 210 is not modified during the updating of the first BIOS image 404). Furthermore, while not described herein in detail, one of skill in the art in possession of the present disclosure will appreciate how the updating of the first BIOS image 404 in the first BIOS storage region 210a in the BIOS storage system 210 may be performed substantially conventionally as well, but again with the exception of the second BIOS storage region 210b in the BIOS storage system 210 remaining reserved/dedicated (i.e., so that the second BIOS storage region 210b of the BIOS storage system 210 is not modified during the updating of the first BIOS image 404).

Figure 5:
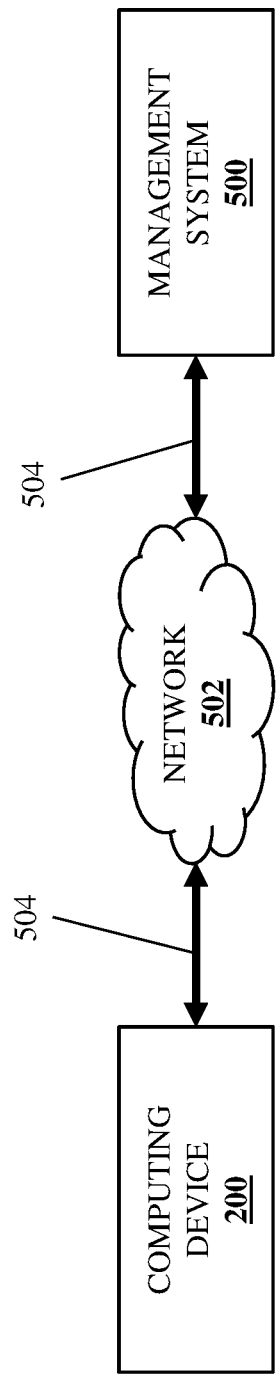
FIG. 5 is a schematic view illustrating an embodiment of the computing device of FIG. 2 coupled to a management system during the method of FIG. 3.

The method 300 then proceeds to block 304 where the BIOS subsystem receives second BIOS region write-enablement information. In the embodiments provided below, block 304 of the method 300 is described as being performed by a user of the computing device 200 after having received the computing device 200 from the computing device manufacturer, and in order to configure the computing device 200 to initialize using the second BIOS image. However, as discussed above, block 304 may be performed by the computing device manufacturer prior to providing the computing device 200 to the user, and in order to configure the computing device 200 to initialize using the second BIOS image, while remaining within the scope of the present disclosure as well. Furthermore, one of skill in the art in possession of the present disclosure will appreciate that blocks 304-310 of the method 300 may be skipped if the user of the computing device 200 would like the computing device 200 to initialize using the first BIOS image. With reference to FIG. 5, the computing device 200 may be coupled to a management system 500 via a network 502. For example, the management system 500 may be provided by the IHS 100 discussed above with reference to FIG. 1 and/or may include some or all of the components of the IHS 100, and in specific examples may be provided by a server device and/or other management devices that would be apparent to one of skill in the art in possession of the present disclosure. Furthermore, the network 502 may be provided by a Local Area Network (LAN), the Internet, combinations thereof, and/or other networks that would be apparent to one of skill in the art in possession of the present disclosure.

As illustrated in FIG. 5, in an embodiment of block 304, the computing device 200 and the management system 500 may perform second BIOS region write-enablement operations 504 via the network 502, which may include the user of the computing device 200 using the computing device 200 to request second BIOS region write-enablement information from the management system 500 via the network 502, the management system 500 generating the second BIOS region write-enablement information, and the management system 500 transmitting the second BIOS region write-enablement information to the computing device 200 via the network 502. In the embodiments discussed below, the second BIOS region write-enablement information is provided by an Outside Equipment Manufacturer (OEM) identifier, a public key that is associated with the user of the computing device 200, and/or other second BIOS region write-enablement information that would be apparent to one of skill in the art in possession of the present disclosure. While OEM identifiers are conventionally utilized to "rebrand" computing devices (e.g., from a brand associated with the computing device manufacturer to a second brand associated with the employer of the user of the computing device 200), one of skill in the art in possession of the present disclosure will appreciate how OEM identifiers may be modified to provide the second BIOS region write-enablement information (e.g., while still providing their rebranding functionality in many embodiments).

As such, in a specific example, the user of the computing device 200 may utilize a RoT device (e.g., the iDRAC device discussed above) to request and be provided with an OEM identifier and user-associated public key from the computing device manufacturer of the computing device 200, and the OEM identifier and user-associated public key may be provided to an OEM identifier module in the RoT device included in the computing device 200. However, as discussed above, in other embodiments the computing device manufacturer may provide the OEM identifier and user-associated public key to the OEM identifier module in the RoT device of the computing device 200 while remaining within the scope of the present disclosure as well.

The method 300 then proceeds to block 306 where the BIOS subsystem enables writing to the second BIOS storage region of the BIOS storage system. In an embodiment, at block 306, the second BIOS region write-enablement information may be provided to the BIOS engine 208 and, in response, the BIOS engine 208 may operate to enable writing to the second BIOS storage region 210b of the BIOS storage system 210. For example, at block 306, the OEM identifier module in the RoT device of the computing device 200 may operate to set an OEM identifier flag in response to being provided the OEM identifier, and the setting of the OEM identifier flag may cause the BIOS engine 208 to allow writing to the second BIOS region 210b of the BIOS storage system 210, as well as indicate to the BIOS engine 208 that subsequent boots of the computing device 200 should utilize a second BIOS image written to the second BIOS region 210b in the BIOS storage system 210 (discussed in further detail below). However, while a specific example is provided, one of skill in the art in possession of the present disclosure will appreciate how writing may be enabled to the second BIOS region 210b of the BIOS storage system 210 in a variety of manners that will fall within the scope of the present disclosure as well. In addition, the user-associated public key provided in the second BIOS region write-enablement information along with the OEM identifier may be provided to the BIOS engine 208 at block 306 while remaining within the scope of the present disclosure as well.

Figure 6:
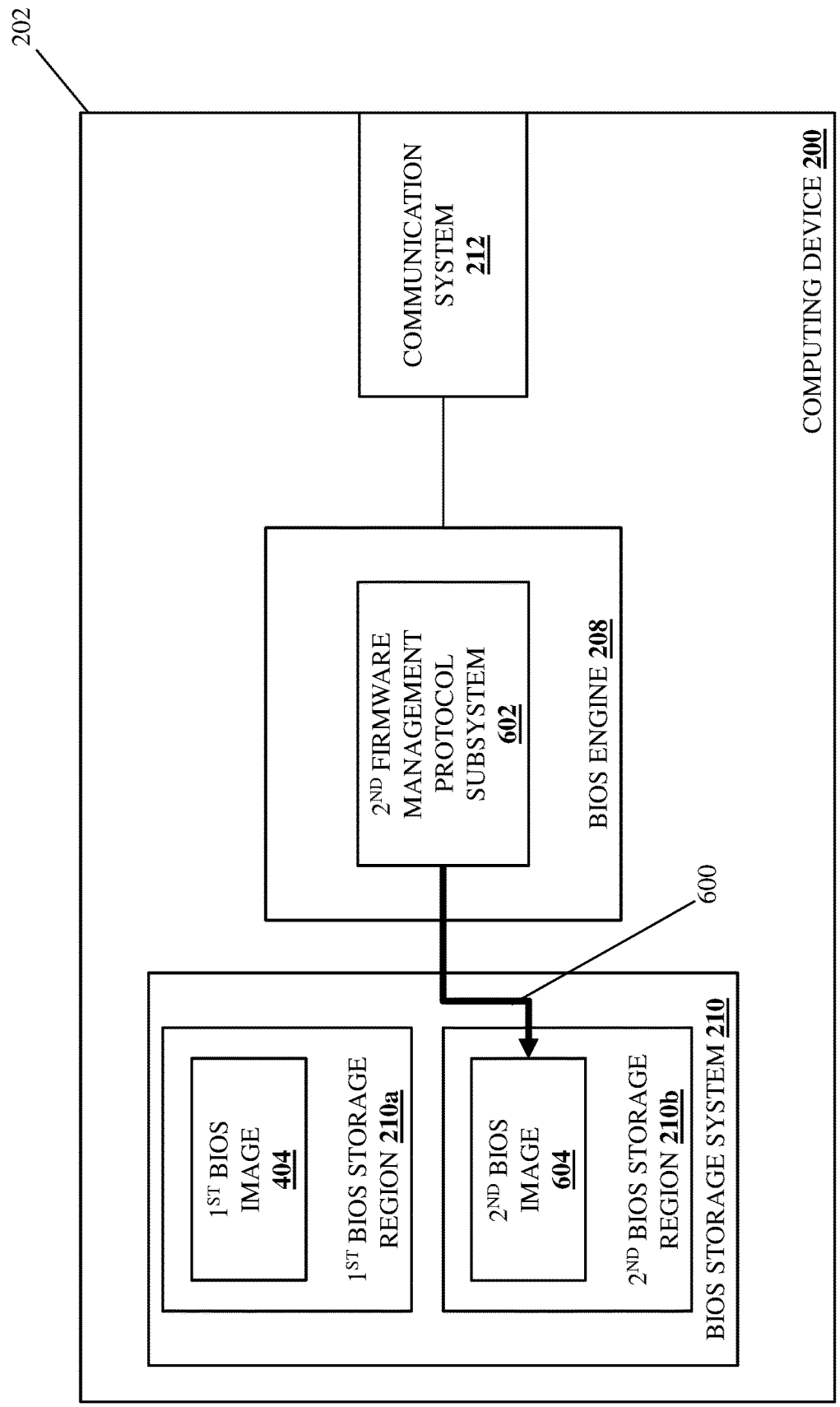
FIG. 6 is a schematic view illustrating an embodiment of the computing device of FIG. 2 operating during the method of FIG. 3.

The method 300 then proceeds to block 308 where the BIOS subsystem writes a second BIOS image to the second BIOS storage region. With reference to FIG. 6, in an embodiment of block 308, the BIOS engine 208 may perform second BIOS image writing operations 600 that may include the BIOS engine 208 providing a second FMP subsystem 602 and using the second FMP subsystem 602 to write a second BIOS image 604 to the second BIOS storage region 210b in the BIOS storage system 210. As discussed above, the BIOS engine 208 may be configured to provide the second FMP subsystem 602 (e.g., using UEFI capsule techniques) in order to update the second BIOS image/ second BIOS storage region 210b, and the second BIOS image writing operations 600 described above may provide for the first writing of the second BIOS image 604 to the second BIOS storage region 210b in the BIOS storage system 210 (e.g., following a request to use the second BIOS image with the computing device 200 at block 304).

As will be appreciated by one of skill in the art in possession of the present disclosure, the second BIOS image 604 may be provided to the BIOS engine 208 in a variety of manners. For example, the second BIOS image 604 may be retrieved as part of the second BIOS region write-enablement operations 504, and thus the second BIOS image 604 may be provided by the computing device manufacturer (e.g., via the management system 500) to the computing device 200 via the network 502, although retrieval of the second BIOS image 604 from other sources is envisioned as falling within the scope of the present disclosure as well. In another example, the second BIOS image 604 may be retrieved at some time following the second BIOS region write-enablement operations 504, and may be provided by the computing device manufacturer (e.g., via the management system 500) to the computing device 200 via the network 502, or from other sources that would be apparent to one of skill in the art in possession of the present disclosure. In yet another example, the second BIOS image 604 may be provided by the computing device manufacturer during the manufacture of the computing device 200. In any of these examples, the second BIOS image 604 may be stored in the BIOS memory system 206 using UEFI capsule techniques. However, while several specific examples are provided, one of skill in the art in possession of the present disclosure will recognize that the second BIOS image 604 may be provided to the BIOS engine 208 in a variety of other manners that will fall within the scope of the present disclosure as well.

In a specific example, a reboot of the computing device 200 at block 308 (e.g., following the enablement of writing to the second BIOS storage region 210b of the BIOS storage system 210) may result in the BIOS engine 208 providing a bootloader (e.g., the same bootloader that is discussed above as providing the first FMP subsystem 402 with reference to block 302, with that bootloader loading the second FMP subsystem 602 relatively early in the POST initialization process and before the boot storage system 210 is restricted (e.g., before a SPI chip is locked).

In the embodiments discussed below, the second BIOS image 604 is a LinuxBoot BIOS image that utilizes a subset of the initialization drivers utilized by the first BIOS image 404 provided by the conventional UEFI BIOS image discussed above. For example, the LinuxBoot BIOS image may utilize the same three initialization phases as the conventional UEFI BIOS image discussed above, but may perform the DXE phase with only a subset of the DXE initialization drivers (e.g., only the subset of the DXE initialization drivers that are required to run the Linux software utilized with the LinuxBoot BIOS image), and without any third-party drivers associated with option Read-Only Memory (ROM) storage devices and Local Area Network (LAN) On Motherboard (LOM) devices. As such, in a specific example, the second BIOS image 604 is a LinuxBoot BIOS image that may only utilize the DXE initialization drivers for Advanced Configuration and Power Interface (ACPI) functionality, System Management BIOS (SMBIOS) functionality, System Management Interrupt (SMI) functionality, and/or other functionality that one of skill in the art in possession of the present disclosure will recognize is required to run Linux software used with LinuxBoot BIOS images. However, while a particular second first BIOS image 604 has been described, one of skill in the art in possession of the present disclosure will appreciate how other second BIOS images will fall within the scope of the present disclosure as well.

As such, in a specific example, the writing of the second BIOS image 604 to the second BIOS storage region 210b in the BIOS storage system 210 may include the BIOS engine 208 retrieving UEFI capsules that store the second BIOS image from the BIOS memory system 206, processing the UEFI capsules to reconstruct the second BIOS image 604 from those UEFI capsules, locating Firmware Management Protocols (FMPs) and selecting the second FMP subsystem 602 provided for the second BIOS image 604/second BIOS storage region 210b of the BIOS storage system 210, using the second FMP subsystem 602 to authenticate the second BIOS image 604 using the user-associated private key that was received in the second BIOS region write-enablement information and, in response to authentication of the second BIOS image 604, using the second FMP subsystem 602 (e.g., "FMP SetImage( )") to write the second BIOS image 604 to the second BIOS storage region 210b in the BIOS storage system 210, followed by a reset of the computing device 200.

Furthermore, while not described herein in detail, one of skill in the art in possession of the present disclosure will appreciate how the updating of the second BIOS image 604 in the second BIOS storage region 210b in the BIOS storage system 210 may be performed in a substantially similar manner as well. For example, the BIOS engine 208 may receive a signed version of the updated second BIOS image and, in response, store that updated second BIOS image using UEFI capsule techniques, and reboot the computing device 200. The BIOS engine 208 may then retrieve UEFI capsules that store the updated second BIOS image from the BIOS memory system 206, process the UEFI capsules to reconstruct the updated second BIOS image from those UEFI capsules, locate FMPs and selecting the second FMP subsystem 602 provided for the updated second BIOS image/second BIOS storage region 210b of the BIOS storage system 210, use the second FMP subsystem 602 to authenticate the updated second BIOS image using the user-associated private key that was received in the second BIOS region write-enablement information and, in response to authentication of the updated second BIOS image, use the second FMP subsystem 602 (e.g., "FMP SetImage( )") to write the updated second BIOS image to the second BIOS storage region 210b in the BIOS storage system 210, followed by a reset of the computing device 200.

The method 300 then proceeds to block 310 where the BIOS subsystem performs a second initialization process using the second BIOS image. In an embodiment, at block 310 and following a reboot after the writing of the second BIOS image 604 to the second BIOS storage region 210b in the BIOS storage system 210, the BIOS engine 208 will operate to utilize the second BIOS image 604 in the second BIOS storage region 210b in the BIOS storage system 210 to perform a second initialization process (e.g., a LinuxBoot initialization process) that, as discussed above, utilizes a subset of the initialization drivers utilized in the first initialization process by the conventional UEFI BIOS image discussed above, in order to initialize the computing device 200 and provide the computing device 200 in a runtime state (e.g., where the computing device 200 is controlled by an operating system and/or applications). As discussed above, the setting of the OEM identifier flag discussed above may indicate to the BIOS engine 208 that subsequent boots of the computing device 200 should utilize the second BIOS image 604 written to the second BIOS region 210b in the BIOS storage system 210, and one of skill in the art in possession of the present disclosure will appreciate how the OEM identifier flag may be removed/unset to indicate to the BIOS engine 208 that subsequent boots of the computing device 200 should utilize the first BIOS image 404 written to the first BIOS region 210a in the BIOS storage system 210.

In a specific example where the computing device 200 is configured to use the second BIOS image 604 provided by a LinuxBoot BIOS image, block 310 of the method 300 may include the computing device 200 powering on, and the BIOS engine 208 performing the SEC phase and PEI phase of the conventional UEFI boot operations discussed above, followed by a DXE phase in which the BIOS engine 208 will parse a DXE module list and only dispatch DXE modules that are needed for LinuxBoot operations (as compared to when the computing device 200 is configured to use the UEFI BIOS image and all DXE modules in the DXE module list are dispatched). The boot operations may then continue to Boot Device Selection (BDS) operations where the BIOS engine 208 will not connect any UEFI option ROM drivers and will only create a LinuxBoot boot option (as compared to when the computing device 200 is configured to use the UEFI BIOS image, and UEFI option ROM drivers are connected and multiple boot options are built).

The boot operations may then continue to POST where the second BIOS image 604 (e.g., the LinuxBoot BIOS image) is the only bootable BIOS image presented to the BIOS engine 208 (e.g., the first BIOS image 404 may be hidden or otherwise suppressed). As will be appreciated by one of skill in the art in possession of the present disclosure, the suppression of other bootable BIOS images and provisioning of only the LinuxBoot BIOS image and its reduced utilization of initialization drivers during POST will result in relatively fast initialization of the computing device 200 (i.e., relative to the conventional UEFI BIOS image discussed above) and subsequent control of the computing device 200 by an operating system (e.g., a Linux operating system).

In some embodiments, the BIOS engine 208 may be configured to provide a Human Interface Infrastructure (HII) configuration utility using, for example, the bootloader that is discussed above as being utilized to provide both of the first FMP subsystem 402 and the second FMP subsystem 602. One of skill in the art in possession of the present disclosure will recognize that conventional LinuxBoot systems do not provide an HII configuration utility, and that the HII configuration utility provided by the BIOS engine 208 may be text-only due to the tendency of LinuxBoot users to utilize serial console redirection without support for local video and graphics-based interfaces. As such, settings of the computing device 200 may be configurable even when the LinuxBoot BIOS image is utilized, and one of skill in the art in possession of the present disclosure will appreciate how configuration tools such as REDFISH and RACADMIN may be enabled in a similar manner.

As will be appreciated by one of skill in the art in possession of the present disclosure, after being configured to use the second BIS image 604, the computing device 200 may be configured to use the first BIOS image 404 again by removing (e.g., deleting) the OEM identifier from the BIOS engine 208 in order to cause the BIOS engine to utilize the first BIS image 404 on subsequent boots of the computing device 200. Similarly, in the event of a BIOS corruption or other issue, BIOS recovery operations for the computing device 200 may be initiated by the user of the computing device 200, and may include the RoT device in the computing device 200 reinstalling the first BIOS image 404 on the first BIOS storage region 210 the BIOS storage system 210 (e.g., the code SPI ROM storage device) and restoring the OEM identifier to the BIOS engine 208 (e.g., via a restore SPI (rSPI)) so that the user of the computing device 200 may reinstall the second BIOS image 604 on the second BIOS storage region 210b of the BIOS storage system 210. Similarly as well, the computing device manufacturer may enable the use of the second BIOS image 604 (e.g., as part of computing device manufacture, computing device service, etc.) by simply provide the OEM identifier to the BIOS engine 208 in the computing device 200, with the second BIOS image 604 then provided on the second BIOS storage region 210b of the BIOS storage system 210 by either the computing device manufacturer or the user.

A specific implementation of the computing device 200 may provide the computing device 200 without a Platform Controller Hub (PCH), and with boot guard profiles and key manifests built into a Firmware Interface Table (FIT) in the BIOS SPI processing system (e.g., rather than being fused in the PCH). In such an implementation, the RoT device in the computing device 200 may operate to ensure that the BIOS SPI processing system is protected and authenticated before releasing the CPU in the computing device 200 out of reset, thus allowing the BIOS engine 208 to maintain root of trust chain checks in the SEC phase, PEI phase, and DXE phases of conventional UEFI boot operations (even when using the second BIOS image 604/LinuxBoot BIOS image).

Thus, systems and methods have been described that reserve/dedicate a second BIOS storage region of a BIOS storage system for storing a second BIOS image (along with a first BIOS image that is stored in a first BIOS storage region of the BIOS storage system), and enable the selection of that second BIOS image for use with the computing device, as well as the updating of that second BIOS image when desired. For example, the secure multi-BIOS-image system of the present disclosure may include a BIOS storage system having a first BIOS storage region and a second BIOS storage region. A first BIOS image is stored in the first BIOS storage region and is configured to utilize a plurality of initialization drivers during a first initialization process. A BIOS subsystem is coupled to the BIOS storage system. The BIOS subsystem receives second BIOS storage region write-enablement information and, in response, enables writing to the second BIOS storage region. Subsequent to enabling writing to the second BIOS storage region, the BIOS subsystem writes a second BIOS image to the second BIOS storage region. The BIOS subsystem may then use the second BIOS image that was written to the second BIOS storage region to perform a second initialization process that utilizes a subset of the plurality of initialization drivers. As such, the use of a second BIOS image that utilizes limited initialization drivers is supported in a computing device, while also allowing for secure use of a first BIOS image that utilizes the full set of initialization drivers in that computing device Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secure multi-Basic Input/Output System (BIOS)-image system, comprising:

a Basic Input/Output System (BIOS) storage system that includes a first BIOS storage region and a second BIOS storage region;
a first BIOS image that is stored in the first BIOS storage region and that is configured to perform a first initialization process that utilizes a plurality of initialization drivers to initialize a computing device to provide the computing device in a runtime state that enables full functionality of the computing device; and
a BIOS subsystem that is coupled to the BIOS storage system and that is configured to:
receive second BIOS storage region write-enablement information;
enable, in response to receiving the second BIOS storage region write-enablement information, writing to the second BIOS storage region;
write, subsequent to enabling writing to the second BIOS storage region, a second BIOS image to the second BIOS storage region; and
perform, using the second BIOS image that was written to the second BIOS storage region and without using the first BIOS image that is stored in the first BIOS storage region, a second initialization process that is independent from the first initialization process and that utilizes a subset of the plurality of initialization drivers to initialize the computing device to provide the computing device in the runtime state that enables the full functionality of the computing device.

2. The system of claim 1, wherein the BIOS subsystem is configured to:
provide a first firmware management protocol subsystem; and
write, using the first firmware management protocol subsystem, the first BIOS image to the first BIOS storage region.

3. The system of claim 2, wherein the BIOS subsystem is configured to:
provide a second firmware management protocol subsystem that is different than the first firmware management protocol subsystem, wherein the BIOS subsystem uses the second firmware management protocol system to write the second BIOS image to the second BIOS storage region.

4. The system of claim 1, wherein the first BIOS image is a Unified Extensible Firmware Interface (UEFI) BIOS image, and wherein the second BIOS image is a LinuxBoot BIOS image.

5. The system of claim 1, wherein the second BIOS storage region write-enablement information is provided by an Original Equipment Manufacturer (OEM) identifier.

6. The system of claim 1, wherein the plurality of initialization drivers are Driver eXecution Environment (DXE) drivers.

7. An Information Handling System (IHS), comprising:
a processing system; and
a memory system that is coupled to the processing system and that includes instructions that, when executed by the processing system, cause the processing system to provide a Basic Input/Output System (BIOS) engine that is configured to:
write a first BIOS image to a first BIOS storage region in a BIOS storage system, wherein the first BIOS image is configured to perform a first initialization process that utilizes a plurality of initialization drivers to initialize the IHS to provide the IHS in a runtime state that enables full functionality of the IHS;
receive second BIOS storage region write-enablement information;
enable, in response to receiving the second BIOS storage region write-enablement information, writing to a second BIOS storage region of the BIOS storage system;
write, subsequent to enabling writing to the second BIOS storage region, a second BIOS image to the second BIOS storage region; and
perform, using the second BIOS image that was written to the second BIOS storage region and without using the first BIOS image that is stored in the first BIOS storage region, a second initialization process that is independent from the first initialization process and that utilizes a subset of the plurality of initialization drivers to initialize the IHS to provide the IHS in the runtime state that enables full functionality of the IHS.

8. The IHS of claim 7, wherein the BIOS engine is configured to:
provide a first firmware management protocol subsystem, wherein the BIOS engine uses the first firmware management protocol subsystem to write the first BIOS image to the first BIOS storage region.

9. The IHS of claim 8, wherein the BIOS engine is configured to:
provide a second firmware management protocol subsystem that is different than the first firmware management protocol subsystem, wherein the BIOS engine uses the second firmware management protocol subsystem to write the second BIOS image to the second BIOS storage region.

10. The IHS of claim 7, wherein the first BIOS image is a Unified Extensible Firmware Interface (UEFI) BIOS image, and wherein the second BIOS image is a LinuxBoot BIOS image.

11. The IHS of claim 7, wherein the second BIOS storage region write-enablement information is provided by an Original Equipment Manufacturer (OEM) identifier.

12. The IHS of claim 11, wherein the second BIOS storage region write-enablement information includes a public key, and wherein the BIOS engine is configured to:
authenticate, prior to using the second BIOS image to perform the second initialization process, the second BIOS image using the public key.

13. The IHS of claim 7, wherein the plurality of initialization drivers are Driver eXecution Environment (DXE) drivers.

14. A method for providing a secure multi-Basic Input/Output System (BIOS)-image system, comprising:
writing, by a Basic Input/Output System (BIOS) subsystem, a first BIOS image to a first BIOS storage region in a BIOS storage system, wherein the first BIOS image is configured to perform a first initialization process that utilizes a plurality of initialization drivers to initialize a computing device to provide the computing device in a runtime state that enables full functionality of the computing device;
receiving, by the BIOS subsystem, second BIOS storage region write-enablement information;
enabling, by the BIOS subsystem in response to receiving the second BIOS storage region write-enablement information, writing to a second BIOS storage region of the BIOS storage system;

writing, by the BIOS subsystem subsequent to enabling writing to the second BIOS storage region, a second BIOS image to the second BIOS storage region; and performing, by the BIOS subsystem using the second BIOS image that was written to the second BIOS storage region and without using the first BIOS image that is stored in the first BIOS storage region, a second initialization process that is independent from the first initialization process and that utilizes a subset of the plurality of initialization drivers to initialize the computing device to provide the computing device in the runtime state that enables full functionality of the computing device.

15. The method of claim 14, further comprising:

providing, by the BIOS subsystem, a first firmware management protocol subsystem, wherein the BIOS subsystem uses the first firmware management protocol subsystem to write the first BIOS image to the first BIOS storage region.

16. The method of claim 14, further comprising:

providing, by the BIOS subsystem, a second firmware management protocol subsystem that is different than the first firmware management protocol subsystem, wherein the BIOS subsystem uses the second firmware management protocol subsystem to write the second BIOS image to the second BIOS storage region.

17. The method of claim 14, wherein the first BIOS image is a Unified Extensible Firmware Interface (UEFI) BIOS image, and wherein the second BIOS image is a LinuxBoot BIOS image.

18. The method of claim 14, wherein the second BIOS storage region write-enablement information is provided by an Original Equipment Manufacturer (OEM) identifier.

19. The method of claim 14, wherein the second BIOS storage region write-enablement information includes a public key, and wherein the method further comprises:

authenticating, by the BIOS subsystem prior to using the second BIOS image to perform the second initialization process, the second BIOS image using the public key.

20. The method of claim 14, wherein the plurality of initialization drivers are Driver eXecution Environment (DXE) drivers.

* * * * *